UNITED STATES PATENT OFFICE.

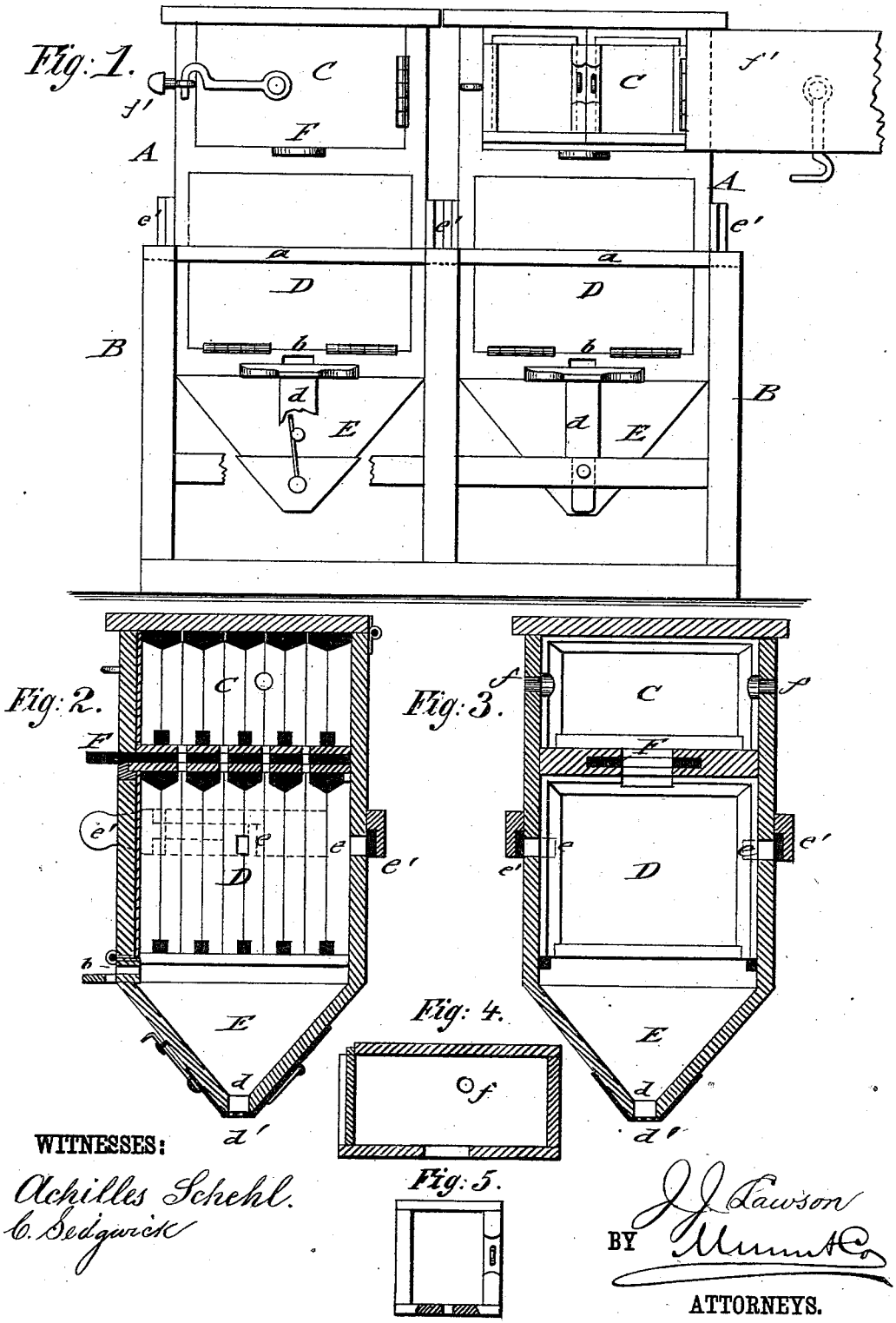

JOHN J. LAWSON, OF DAHLONEGA, ASSIGNOR OF ONE-HALF HIS RIGHT TO EDWARD ULREY AND ALLEN BESSE, OF WAPELLO COUNTY, IOWA.

IMPROVEMENT IN BEE-HIVES.

Specification forming part of Letters Patent No. 213,212, dated March 11, 1879; application filed July 31, 1878.

*To all whom it may concern:*

Be it known that I, JOHN J. LAWSON, of Dahlonega, in the county of Wapello and State of Iowa, have invented a new and Improved Bee-Hive, of which the following is a specification:

In the accompanying drawings, Figure 1 represents a front elevation of my improved bee-hive. Figs. 2 and 3 are vertical central sections of the same, taken on planes at right angles to each other; and Figs. 4 and 5 are, respectively, a vertical longitudinal section and a sectional front view of a removable rack of the upper honey-chamber.

Similar letters of reference indicate corresponding parts.

This invention relates to improvements in bee-hives; and consists in certain improvements therein, as will be hereinafter more fully set forth, and pointed out in the claim.

Referring to the drawings, A represents the outer rectangular casing of my improved bee-hive, which is supported on longitudinal and transverse pieces of a frame, B, by which the hives may be conveniently moved, transported, or shipped without being disarranged. As the dimensions of the hives and of the supporting-frame correspond, the hives may be interchanged from one frame to another, as required.

The frame B is provided with movable front bars, $a$, fitting in recesses in the frame B, that serve to close the lower front doors of the hive, and also admit the removing of any hive by being moved to the right or left of the doors.

Any desired number of hives may be arranged on a frame, from two upward, as desired.

The hive is constructed with a hinged lid and front door for the upper chamber, C, and with a hinged door for the lower chamber, D, the entrance-opening $b$, in front, being opened or closed by a vertically-adjustable gate, $d$.

The bottom E of the hive is made in the shape of a hopper or inverted pyramid, with a bottom aperture, $d$, for the purpose of affording protection against moths, and for the purpose of ventilation.

The side and rear walls of the lower chamber, D, are provided with exit-apertures $e$ and exterior slides, $e'$, for the purpose of establishing communication from one hive to an adjoining one, whether on the side or back. By opening the connecting apertures $e$ between an empty and a colonized hive and closing the front entrance-opening of the latter, the bees are compelled to pass out or in through the empty hive, so as to become fully acquainted therewith.

A colony of bees that is about to swarm from the main hive will naturally occupy the empty hive, so that thereby no bees are lost, nor time in watching and hiving the bees. The bees actually hive themselves by this arrangement, which may also be utilized for the purpose of improving the stock by crossing a hive with a better species with one of an inferior species of bees.

It may be readily tested whether the bees occupy both hives or not by closing the communication and opening the main entrances in front.

Subsequent hivings are secured in the same way by causing the bees to pass through an empty adjoining hive during the swarming season. A colony of bees may also be transferred easily from one hive to an empty one by establishing communication between them, and introducing a quantity of smoke through each of the other apertures, and driving all or a part of the colony into the new hive.

The honey may be readily taken from the top chamber, C, by drawing out a horizontal slide, F, that is arranged between the upper and lower chambers. This closes the communication between the chambers, and separates the upper combs.

The upper chamber is provided with side apertures, $f$, as well as the corresponding racks of the same, so that the bees may pass out and return to the hive without becoming aware of the cutting out of the honey. These apertures are closed when not required for this purpose by means of pins or plugs $f'$. The apertures should be opened about twenty-four hours before taking out the honey, so that the upper chamber may be entirely emptied of bees.

The top racks may be arranged so as to be taken out either at the top, by opening the lid, as shown in Figs. 2 and 3, or by sliding them out at the front, as shown in Figs. 4 and 5. The bees are not disturbed in the least by this mode of taking honey, may be hived without swarming, and the hives themselves moved, shipped, cleaned, and ventilated in convenient and effective manner.

Having thus described my invention, I claim as new and desire to secure by Letters Patent—

In combination with a series of hives, the supporting-frame B, provided with recesses, bar $a$, and movable gate $d$, adjustable in said frame, substantially as described, and for the purpose set forth.

JOHN J. LAWSON.

Witnesses:
ELI ARMSTRONG,
CHARLES LAWSON.